(12) United States Patent
Valentini et al.

(10) Patent No.: US 8,710,116 B2
(45) Date of Patent: Apr. 29, 2014

(54) INKJET INK

(75) Inventors: Jose Esteban Valentini, West Chester, PA (US); Dean M. Fake, Wilmington, DE (US); Christian Jackson, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 809 days.

(21) Appl. No.: 11/891,087

(22) Filed: Aug. 8, 2007

(65) Prior Publication Data
US 2008/0017067 A1  Jan. 24, 2008

Related U.S. Application Data

(63) Continuation of application No. 10/843,133, filed on May 11, 2004, now abandoned.

(60) Provisional application No. 60/471,798, filed on May 19, 2003.

(51) Int. Cl.
| | | |
|---|---|---|
| B41J 2/01 | (2006.01) |
| B41J 2/17 | (2006.01) |
| B41J 2/18 | (2006.01) |
| B60C 1/00 | (2006.01) |
| C08G 18/08 | (2006.01) |
| C08J 3/00 | (2006.01) |
| C08K 3/04 | (2006.01) |
| C08L 31/00 | (2006.01) |
| C08L 33/00 | (2006.01) |
| C08L 53/00 | (2006.01) |
| C08L 75/00 | (2006.01) |
| C09D 5/00 | (2006.01) |
| C09D 5/02 | (2006.01) |
| C09D 11/00 | (2014.01) |
| C09J 7/02 | (2006.01) |
| G01D 11/00 | (2006.01) |

(52) U.S. Cl.
USPC ............ 523/160; 106/31.6; 347/1; 347/85; 347/95; 347/100; 523/161; 524/495; 524/505; 524/507; 524/556

(58) Field of Classification Search
USPC .......... 523/160, 161; 524/495, 556, 507, 505; 106/31.6; 347/1, 85, 95, 100
See application file for complete search history.

(56) References Cited

U.S. PATENT DOCUMENTS

| | | |
|---|---|---|
| 5,571,311 A | 11/1996 | Belmont et al. |
| 5,630,868 A | 5/1997 | Belmont et al. |
| 5,672,198 A | 9/1997 | Belmont |
| 6,057,384 A | 5/2000 | Nguyen et al. |
| 6,103,780 A | 8/2000 | Matzinger et al. |
| 6,329,446 B1 | 12/2001 | Sacripante et al. |
| 7,176,248 B2 | 2/2007 | Valentini et al. |
| 2002/0147252 A1 | 10/2002 | Adams |
| 2003/0184629 A1 * | 10/2003 | Valentini et al. .............. 347/100 |

FOREIGN PATENT DOCUMENTS

| | | |
|---|---|---|
| EP | 0851012 A2 * | 7/1998 |
| EP | 1 114 851 | 7/2001 |
| EP | 1 146 090 | 10/2001 |
| EP | 0 894 835 | 3/2002 |
| EP | 1 304 364 | 4/2003 |
| WO | WO 03/062331 * | 7/2003 |

OTHER PUBLICATIONS

U.S. Department of Labor, Occupational Safety & Health Administration (OSHA) Chemical Sampling Information, Phenoxyethylacrylate, Last Revision Jun. 25, 1992.

* cited by examiner

*Primary Examiner* — Patrick Niland
(74) *Attorney, Agent, or Firm* — Simon L. Xu

(57) ABSTRACT

This invention pertains to an ink for inkjet printing, in particular to an aqueous ink comprising a self-dispersing pigment colorant and certain soluble polymers which enhance print quality without compromising jetting performance.

13 Claims, No Drawings

INKJET INK

CROSS-REFERENCE TO RELATED APPLICATION

This application is a continuation of U.S. application Ser. No. 10/843,133 (filed May 11, 2004) which claims priority under 35 U.S.C. §119 from U.S. Provisional Application Ser. No. 60/471,798 (filed May 19, 2003), the disclosures of which are incorporated by reference herein for all purposes as if fully set forth.

BACKGROUND OF THE INVENTION

This invention pertains to an inkjet ink, in particular to an aqueous inkjet ink comprising self-dispersible pigment and certain soluble polymers to improve print quality.

Inkjet printing is a non-impact printing process in which droplets of ink are deposited on print media, such as paper, to form the desired image. The droplets are ejected from a printhead in response to electrical signals generated by a microprocessor.

Both dyes and pigments have been used as colorants for inkjet inks. While dyes are typically easier to formulate compared to pigments, they tend to fade quickly and are more prone to rub off. Inks comprising pigments dispersed in aqueous media are advantageously superior to inks using water-soluble dyes in water-fastness and light-fastness of printed images.

Pigments suitable for aqueous inkjet inks are in general well-known in the art. Traditionally, pigments were stabilized by dispersing agents, such as polymeric dispersants or surfactants, to produce a stable dispersion of the pigment in the vehicle. More recently though, so-called "self-dispersible" or "self-dispersing" pigments (hereafter "SDP") have been developed. As the name would imply, SDPs are dispersible in water without dispersants.

SDPs are often advantageous over traditional dispersant stabilized pigments from the standpoint of greater stability and lower viscosity at the same pigment loading. This can provide greater formulation latitude in final ink.

Prints made with SDP ink, however, tend to be susceptible to rub off and smear. EP-A-1114851 demonstrates (Comparative Example 2 in Table 3) the problem of poor smear resistance in an SDP inkjet ink (therein referred to as rubbing/scratching resistance). There is taught the combination of SDP and dispersant stabilized pigment to improve image properties. EP-A-1158030 likewise demonstrates (Example 9 in Table 1) the problem of poor smear resistance with SDP inkjet ink (therein is referred to as highlighter resistance).

Addition of polymer binder to improve print properties is often proposed. Ink with SDP and polymer are disclosed, for example, in U.S. Pat. No. 5,571,311, U.S. Pat. No. 5,630,868, U.S. Pat. No. 5,672,198, U.S. Pat. No. 6,057,384, U.S. Pat. No. 6,103,780, U.S. Pat. No. 6,329,446, US 20020147252, EP-A-1304364, EP-A-1146090 and EP-A-0894835.

All of the above-identified publications are incorporated by reference herein for all purposes as if fully set forth.

SDP ink, like any inkjet ink, must exhibit good jetting performance (jetability). Favorable jetability characteristics include stable drop volume and direction, and little or no kogation. Additives to the ink formulation to improve print quality should not come at the expense of jetability.

A need still exists for improved inkjet ink formulations of SDPs that provide good print quality and good jetability.

SUMMARY OF THE INVENTION

It has now been found that the addition of a soluble structured polymer binder to an aqueous ink comprising SDP colorant allows improved fastness of the printed image without compromising jetting performance. In contrast, addition of soluble unstructured (random) polymer is detrimental to jetting performance.

Further, it has been found that the jetting performance of an ink comprising a SDP and a dispersed polymer binder can be improved by addition of a soluble structured polymer.

In accordance with these findings, the present invention pertains to an aqueous inkjet ink composition comprising:
(a) an SDP colorant;
(b) an aqueous vehicle; and
(c) a soluble structured polymer.

The ink jet ink may optionally contain other additives and adjuvants well-known to those of ordinary skill in the relevant art. One such optional additive is a dispersed polymer binder. Preferably, the SDP colorant is a carbon black SDP colorant.

The present invention also pertains to an inkjet ink set for color printing, comprising at least three differently colored inks (such as CMY), and preferably at least four differently colored inks (such as CMYK), wherein at least one of the inks is an aqueous inkjet ink as set forth above.

The present invention still further pertains to a method for inkjet printing comprising the step of jetting an ink onto a substrate, wherein the ink is the aqueous inkjet ink as set forth above.

The present invention still further pertains to a method for inkjet printing comprising the step of jetting an inkjet ink set onto a substrate, wherein the inkjet ink set is as set forth above.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise.

DETAILED DESCRIPTION OF THE PREFERRED EMBODIMENTS

According to the present invention, there is provided an inkjet ink comprising an SDP colorant, an aqueous vehicle and a certain soluble polymer. The prescribed soluble polymer is a "structured polymer" which, when present at the proper levels in the ink formulation, enhance print quality without sacrificing jetting performance. The ink may optionally comprise a dispersed polymer binder to further enhance print quality. Also, the ink may optionally contain other additives and adjuvants well-known in the relevant art.

Herein, reference to enhanced or improved "print quality" generally means some aspect of fastness (resistance to color removal) is increased, including, for example, rub fastness (finger rub), water fastness (water drop) and smear fastness (higher pen stroke)

Colorant

The colorant in the inks of present invention comprises a pigment. By definition, pigments do not form (to a significant degree) a solution in the aqueous vehicle and must be dispersed.

The pigment colorants of the present invention are more specifically self-dispersing pigments. SDPs are surface modified with dispersibility imparting groups to allow stable dispersion without separate dispersant. For dispersion in an aqueous vehicle, the surface modification involves addition of hydrophilic groups and most typically ionizable hydrophilic groups. See, for example, U.S. Pat. No. 5,554,739, U.S. Pat. No. 5,571,311, U.S. Pat. No. 5,609,671, U.S. Pat. No. 5,672,198, U.S. Pat. No. 5,698,016, U.S. Pat. No. 5,707,432, U.S. Pat. No. 5,718,746, U.S. Pat. No. 5,747,562, U.S. Pat. No. 5,749,950, U.S. Pat. No. 5,803,959, U.S. Pat. No. 5,837,045, U.S. Pat. No. 5,846,307, U.S. Pat. No. 5,851,280, U.S. Pat. No. 5,861,447, U.S. Pat. No. 5,885,335, U.S. Pat. No. 5,895,522, U.S. Pat. No. 5,922,118, U.S. Pat. No. 5,928,419, U.S. Pat. No. 5,976,233, U.S. Pat. No. 6,057,384, U.S. Pat. No. 6,099,632, U.S. Pat. No. 6,123,759, U.S. Pat. No. 6,153,001, U.S. Pat. No. 6,221,141, U.S. Pat. No. 6,221,142, U.S. Pat. No. 6,221,143, U.S. Pat. No. 6,277,183, U.S. Pat. No. 6,281,267, U.S. Pat. No. 6,329,446, U.S. Pat. No. 6,332,919, U.S. Pat. No. 6,375,317, US 2001/0035110, EP-A-1086997, EP-A-1114851, EP-A-1158030, EP-A-1167471, EP-A-1122286, WO01/10963, WO01/25340 and WO01/94476, the disclosures of which are incorporated by reference herein for all purposes as if fully set forth.

The SDP colorant can be further defined by its ionic character. Anionic SDP yields, in an aqueous medium, particles with anionic surface charge. Conversely, cationic SDP yields, in an aqueous medium, particles with cationic surface charge. Particle surface charge can be imparted, for example, by attaching groups with anionic or cationic moieties to the particle surface. The SDP of the present invention are preferably, although not necessarily, anionic.

Anionic moieties attached to the anionic SDP surface can be any suitable anionic moiety but are preferably (I) or (II):

$$—CO_2Z \qquad (I)$$

$$—SO_3Z \qquad (II)$$

wherein Z is selected from the group consisting of conjugate acids of organic bases; alkali metal ions; "onium" ions such as ammonium, phosphonium and sulfonium ions; and substituted "onium" ions such as tetraalkylammonium, tetraalkyl phosphonium and trialkyl sulfonium ions; or any other suitable cationic counterion. Useful anionic moieties also include phosphates and phosphonates. Most preferred are type I ("carboxylate") anionic moieties.

Also preferred is a degree of functionalization wherein the density of anionic groups is less than about 3.5 µmoles per square meter of pigment surface (3.5 µmol/m$^2$), and more preferably less than about 3.0 µmol/m$^2$. Degrees of functionalization of less than about 1.8 µmol/m$^2$, and even less than about 1.5 µmol/m$^2$, are also suitable and may be preferred for certain specific types of SDPs. As used above and otherwise herein, "degree of functionalization" refers to the amount of hydrophilic groups present on the surface of the SDP per unit surface area, measured in accordance with the method described further herein.

Carboxylated anionic SDP species include those described, for example, in previously incorporated U.S. Pat. No. 5,571,311, U.S. Pat. No. 5,609,671 and WO01/94476; and, sulfonated (type II) SDPs include those described, for example, in previously incorporated U.S. Pat. No. 5,571,331, U.S. Pat. No. 5,928,419 and EP-A-1146090.

It is desirable to use small colorant particles for maximum color strength and good jetting. The particle size may generally be in the range of from about 0.005 micron to about 15 microns, is typically in the range of from about 0.005 to about 1 micron, is preferably from about 0.005 to about 0.5 micron, and is more preferably in the range of from about 0.01 to about 0.3 micron.

The levels of SDPs employed in the instant inks are those levels that are typically needed to impart the desired optical density to the printed image. Typically, SDP levels are in the range of about 0.01 to about 10% by weight of the ink.

The SDPs may be black, such as those based on carbon black, or may be colored pigments such as those based on PB 15:3 and 15:4 cyan, PR 122 and 123 magenta, and PY 128 and 74 yellow.

The SDPs may be prepared by grafting a functional group or a molecule containing a functional group onto the surface of the pigment, or by physical treatment (such as vacuum plasma), or by chemical treatment (for example, oxidation with ozone, hypochlorous acid or the like). A single type or a plurality of types of hydrophilic functional groups may be bonded to one pigment particle. The type and degree of functionalization may be properly determined by taking into consideration, for example, dispersion stability in ink, color density, and drying properties at the front end of an ink jet head. Further details may be found by reference to the numerous publications incorporated above.

In one preferred embodiment, the hydrophilic functional group(s) on the SDP are primarily carboxyl groups, or a combination of carboxyl and hydroxyl groups; even more preferably the hydrophilic functional groups on the SDP are directly attached and are primarily carboxyl groups, or a combination of carboxyl and hydroxyl.

Preferred pigments in which the hydrophilic functional group(s) are directly attached may be produced, for example, by a method described in previously incorporated WO01/94476. Carbon black treated by the method described in this publication has a high surface-active hydrogen content that is neutralized with base to provide very stable dispersions in water. Application of this method to colored pigments is also possible.

In a preferred embodiment, the colorant in the ink of the present invention comprises only SDP. If other pigment colorant is present as dispersant-stabilized pigment, the dispersant is preferably a structured polymer such as those referenced herein. Furthermore, when dispersant-stabilized pigment with structured polymer is present, the structured dispersant and the soluble structured polymer for the SDP are preferably the same polymer.

Aqueous Vehicle

"Aqueous vehicle" refers to water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

The amount of aqueous vehicle in the ink is typically in the range of about 70% to about 99.8%, and preferably about 80% to about 99.8%, based on total weight of the ink.

The aqueous vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

Soluble Polymer Binder

The ink contains at least one soluble polymer binder. Soluble means dissolved in the aqueous vehicle. The soluble polymer is furthermore a structured polymer. The term "structured polymer" means a polymer having a block, branched or graft structure. Especially preferred are AB or BAB block copolymers such as those disclosed in U.S. Pat. No. 5,085,698, ABC block copolymers such as those disclosed in disclosed in U.S. Pat. No. 5,519,085, and graft polymers such as those disclosed in U.S. Pat. No. 5,231,131. The disclosures of these three publications are incorporated by reference herein for all purposes as if fully set forth.

Preferably the number average molecular weight ($M_n$) is in the range of about 1,000 to about 20,000, more preferably about 1,000 to about 10,000, and most preferably about 2,000 to about 6,000. These soluble polymers are preferably comprised of ionic monomers, preferably anionic monomers with ionizable acid groups. The preferred acid content is between about 0.65 and about 6 milliequivalents per gram of polymer, and the most preferred being between about 0.90 and about 1.75 milliequivalents per gram of polymer. All polymers may also contain monomers that have hydrophilic groups including, but not limited to, hydroxyls, amides and ethers. Preferably anionic polymers are used with anionic SDP and cationic polymers are used with cationic SDP.

In a particularly preferred embodiment, the soluble binder polymer is comprised substantially of monomers of (meth) acrylic acid and/or derivatives thereof, and the preferred $M_n$ is between about 4000 to about 6000.

In one preferred embodiment, the soluble structured polymer is linear.

The soluble structured polymer is advantageously used at levels, based on the final weight of ink, of at least about 0.3% and preferably at least about 0.6%. Upper limits are dictated by ink viscosity or other physical limitations, but generally no more than about 3% soluble polymer is present in the ink, and more commonly no more than about 2% is present, based on the total weight of the ink.

Also relevant is the weight ratio of pigment to soluble structured polymer binder (P/B). The P/B is preferably between about 0.5 and about 20, more preferably between about 2 and about 10.

Dispersed Polymer Binders

Inks may optionally comprise a dispersed polymer binder. These are polymers that are in a heterogeneous dispersed phase rather than dissolved in the vehicle, and are sometimes also referred to as an "emulsion polymer" or a "latex". The polymers can be any chemical class suitable for binding inks to substrate and include, for example, acrylics, styrene-acrylics and polyurethanes.

Particularly preferred are polyurethane dispersion binders such as those disclosed in US 20030184629, the disclosure of which is incorporated by reference for all purposes as if fully set forth.

Other Ingredients

Other ingredients may be formulated into the inkjet ink, to the extent that such other ingredients do not interfere with the stability and jetability of the ink, which may be readily determined by routine experimentation. Such other ingredients are in a general sense well known in the art.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N",N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element, or ejection conditions for a thermal head, for either a drop-on-demand device or a continuous device, and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and nontoxic.

Although not restricted to any particular viscosity range or printhead, the inventive ink set is particularly suited to lower viscosity applications such as those required by thermal printheads. Thus the viscosity (at 25° C.) of the inventive inks and fixer can be less than about 7 cps, is preferably less than about 5 cps, and most advantageously is less than about 3.5 cps. Thermal inkjet acutators rely on instaneous heating/bubble formation to eject ink drops and this mechanism of drop formation generally requires inks of lower viscosity.

Substrate

The instant invention is particularly advantageous for printing on plain paper such as common electrophotographic copier paper.

Ink Sets

The ink sets in accordance with the present invention comprises at least three differently colored inks (such as CMY), and preferably at least four differently colored inks (such as CMYK), wherein at least one of the inks is an aqueous inkjet ink comprising:
- (a) an SDP colorant;
- (b) an aqueous vehicle; and
- (c) a soluble structured polymer as set forth above.

As indicated above, preferably the ink set comprises at least 4 different colored inks (CMYK), wherein the black (K) ink comprises:
- (a) a black SDP colorant;
- (b) an aqueous vehicle; and
- (c) a soluble structured polymer as set forth above.

The other inks of the ink set are preferably also aqueous inks, and may contain dyes, pigments or combinations thereof as the colorant. Such other inks are, in a general sense, well known to those of ordinary skill in the art.

EXAMPLES

Dispersion 1

Carbon black (S-160 from Degussa, surface area 150 m$^2$/g) was oxidized with ozone according to the process described in WO01/94476 and neutralized with LiOH. After recovery, a 16.6 weight percent dispersion of self-dispersing carbon black pigment in water was obtained with a viscosity of 3.5 cps (25° C.). The median particle size was 110 nm and the acid number (degree of functionalization) was 3.3 μmol/m$^2$. The degree of functionalization, as measured, was slightly above the target level of <3.0 μmol/m$^2$.

The degree of functionalization (acid value) of this SDP (and others in these examples made by the process according to WO01/94476) was determined by the equivalent moles of base required to neutralize the treated pigment to a pH of 7. As the surface hydrophilic groups are substantially all acidic, the acid value also equals the degree of functionalization.

Equivalent moles of base can be determined by titration or, in the case of inorganic bases such as alkali metal hydroxides, by atomic absorption (AA) or Inductive Coupled Plasma (ICP) analysis. Moles of base per gram of SDP is obtained and converted to μmol/m$^2$ by dividing by the surface area of the pigment and adjusting the units appropriately. For accuracy, the neutralized sample must be free of contaminants, such as free acids or salts, which would interfere with the measurement.

Dispersion 2

Carbon black (FW-18 from Degussa, surface area 260 m$^2$/g) was oxidized with ozone according to the process described in WO01/94476. After recovery, a 17 weight percent dispersion of self-dispersing carbon black pigment in water was obtained with a viscosity of 6.4 cps (25° C.). The median particle size was 90 nm and the acid number (degree of functionalization) was less than 2.8 μmol/m$^2$.

Polymer 1 (Soluble Structured Polymer)

Polymer 1 is a block copolymer consisting of benzyl methacrylate/methacrylic acid/ethyltriethyleneglycol methacrylate (BzMA/MAA/ETEGMA, mole ratio 13/13/7.5). It was prepared in a manner similar to "polymer 2" described in U.S. Pat. No. 6,087,416 (incorporated by reference herein for all purposes as if fully set forth), except the amount of ETEGMA was slightly lower. Number average molecular weight was about 5,000 and weight average molecular weight was about 5,000 g/mol.

Polymer 2 (Soluble Random Polymer, Comparative)

Polymer 2 is a random copolymer consisting of benzyl methacrylate, hydroxyethylmethacrylate, ethyltriethyleneglycolmethatcrylate and methacrylic acid (BzMA/HEMA/ETEGMA/MAA, weight ratio 60/20/10/10) was made by the same technique as Polymer 1 except all monomers were co-added, in proper proportion, to make a random polymer. The number average molecular weight was about 5,000 and weight average molecular weight was about 5,000 g/mol.

Polymer 3 (Soluble Structured Polymer)

Polymer 3 is a block copolymer consisting of benzyl methacrylate/methacrylic acid/ethyltriethyleneglycol methacrylate (BzMA/MAA/ETEGMA weight ratio 40/50/10). It was prepared by the same technique as Polymer 1 above. The number average molecular weight was about 2000-2500 and weight average molecular weight was about 2500 g/mol.

Polymer 4 (Soluble Structured Polymer)

Polymer 5 is a block copolymer of methacrylic acid/benzyl methacrylate/ethyltriethyleneglycol methacrylate (MAA/BzMA/ETEGMA, mole ratio 13/15/4). It was prepared in a manner similar to "preparation 4" described in previously incorporated U.S. Pat. No. 5,519,085, except the BzMA ratio is higher. The number average molecular weight was about 5,000 and weight average molecular weight was about 5,000 g/mol.

Polyurethane Dispersion (PUD) Binders

PUD 1 is a polyurethane with polyol component which is a polyester diol. The acid number was 25 and the median particle diameter was 0.018 microns. It was used as a water dispersion with 26% by weight solids.

PUD 2 is a polyurethane with a polyol component which is a polycarbonate polyester diol. The acid number was 25 and the median particle diameter was 0.036 microns. It was used as a water dispersion with 40% by weight solids.

Preparation of Inks

Inks with soluble structured polymer (Ex1-5) and comparative inks with random soluble polymer (C1-3) were prepared according to the following recipes.

|  | Composition, (weight %) | | | | | | | |
|---|---|---|---|---|---|---|---|---|
|  | C1 | C2 | C3 | Ex 1 | Ex 2 | Ex 3 | Ex 4 | Ex 5 |
| Dispersion 1 (pigment) | 4.0 | 4.0 | 4.0 | 4.0 | 4.0 | 4.0 | 4.0 | 4.0 |
| Polymer 1 |  |  |  | 8.0 | 0.4 | 0.2 |  |  |
| Polymer 2 | 8.0 | 0.4 | 0.2 |  |  |  |  |  |
| Polymer 3 |  |  |  |  |  |  | 1.33 | 0.67 |
| Glycerol | 3.0 | 3.0 | 3.0 | 3.0 | 3.0 | 3.0 | 3.0 | 3.0 |
| Ethylene Glycol | 4.0 | 4.0 | 4.0 | 4.0 | 4.0 | 4.0 | 4.0 | 4.0 |
| Surfonyl ® 485 | 1.0 | 1.0 | 1.0 | 1.0 | 1.0 | 1.0 | 1.0 | 1.0 |
| Liponic EG-1 (Lipo Co.) | 1.0 | 1.0 | 1.0 | 1.0 | 1.0 | 1.0 | 1.0 | 1.0 |
| H2O | bal. | bal. | bal. | bal. | bal. | bal. | bal. | bal. |

-continued

| | Composition, (weight %) | | | | | | |
|---|---|---|---|---|---|---|---|
| | C1 | C2 | C3 | Ex 1 | Ex 2 | Ex 3 | Ex 4 | Ex 5 |
| Properties | | | | | | | | |
| Viscosity (cps @25 C.) | 4.84 | 2.20 | 2.10 | 10.20 | 2.34 | 2.24 | 2.18 | 2.10 |
| PH | 9.04 | 7.78 | 7.56 | 8.31 | 7.64 | 7.50 | 7.09 | 7.12 |
| Surface tension (Dyne/cm) | 43.50 | 40.69 | 39.89 | 43.79 | 41.17 | 40.32 | 43.67 | 42.82 |

Inks comprising PUD binder with soluble structured polymer and comparative inks with PUD binder alone were prepared according to the following recipes.

| | Composition, (weight %) | | | |
|---|---|---|---|---|
| | C6 | C7 | Ex6 | Ex7 |
| Dispersion 2 (pigment) | 4 | 4 | 4 | 4 |
| PUD 1 (solids basis) | 0.29 | | 0.29 | |
| PUD 2 (solids basis) | | 0.29 | | 0.29 |
| Polymer 4 | | | 0.29 | 0.29 |
| Glycerol | 13.0 | 13.0 | 13.0 | 13.0 |
| Ethylene Glycol | 4.0 | 4.0 | 4.0 | 4.0 |
| Surfynol ® 485 | 1.0 | 1.0 | 1.0 | 1.0 |
| Liponic EG-1 (Lipo Co.) | 4.0 | 4.0 | 4.0 | 4.0 |
| H2O | bal. | bal. | bal. | bal. |
| Properties | | | | |
| Viscosity (cps @25 C.) | 3.08 | 2.98 | 2.98 | 3.0 |
| PH | 7.53 | 7.37 | 7.33 | 7.45 |
| Surface tension (Dyne/cm) | 40.71 | 39.84 | 41.49 | 40.13 |

Substrate

The following papers were used as substrate in print tests: Hammermill Copy Plus, Xerox 4024 and Hewlett Packard office paper.

Drop Weight Test

An HP51645A thermal inkjet pen was filled with the ink to be tested and a driver controlled by a computer fired 22 selected nozzles at a frequency of 12 kHz for burst of 0.08 milliseconds. The ink drops are collected and weighed, and a weight per drop fired (drop weight) is calculated. The process of firing and weighing drops is repeated, using the same 22 nozzles, until the ink volume in the cartridge (about 25 gm) has been depleted. The drop weight as a function of amount of ink jetted can be plotted if changes occur during the course of the test. Most preferably, from the standpoint of providing good color density, the drop weight remains constant throughout the test.

Kogation Test

Kogation is a measure of the amount of residue left on the nozzles and/or resistors of a thermal ink jet pen after the pen has been used in the Drop Weight test. After prying open the nozzle plate to expose the resistors and nozzle chambers, the used resistors nozzles are observed with a microscope and rated as follows.

Good—No significant amount of residue-Clean resistors

Fair—Small amount of residue-Partially covered resistors

Poor—Significant amount of residue-Covered resistors

Most preferably, from the standpoint of long pen life, there is no residue.

| Results for inks with soluble structured polymer compared to inks with random soluble polymer. | | | |
|---|---|---|---|
| Comparative Example | P/B | Drop wt. (ng) | Kogation |
| C1 | 0.5 | 12 | fair |
| C2 | 10 | 14 | fair |
| C3 | 20 | 18 | poor |
| Inventive Example | P/B | Drop wt. (ng) | Kogation |
| Ex1 | 0.5 | 17 | good |
| Ex2 | 10 | 24 | fair |
| Ex3 | 20 | 25 | good |
| Ex4 | 3 | 29 | good |
| Ex5 | 6 | 28 | good |

For an ink with equivalent formulation as the above, but without any soluble binder ("no added polymer" case), the drop weight was 25-28 nanograms and the kogation rating was good. Adding soluble random polymer (Examples C1-C3) causes a decrease in the kogation rating and a reduction in drop volume. The inventive examples with soluble structured polymer (Examples E1-E5) show good kogation ratings and, generally, a drop weight similar to the "no added polymer" case. The lower drop weight of Ex. 1 may be explained by the relatively higher viscosity. Higher levels of soluble polymer increase ink viscosity and many inkjet pens are designed for lower viscosity ink.

The added soluble structured polymer (binder) improves the fastness of the ink on the printed page, especially at P/B (pigment to binder) ratios greater than about 20 and more effectively at ratios greater than 10. In particular, rub fastness (resistance to rub-off from fingers) and water fastness (resistance to bleed on contact with a water drop) are improved.

| Results for Inks containing polyurethane dispersion binder | | |
|---|---|---|
| Comparative example | Drop Wt. ng | Kogation |
| C6 | 22 | fair |
| C7 | 15* | poor |
| Inventive example | Drop Wt. ng | Kogation |
| Ex6 | 30 | good |
| Ex7 | 23 | good |

*lost jetting, stopped after 5 ml

In the above examples, inks with PUD alone (C6 and C7) are improved by addition of soluble structured polymer (Ex 6-7). The Kogation is better and the drop volume is higher. Furthermore, benefits in fastness of the ink on the printed page from both the soluble structured polymer and the PUD are realized. Thus the rub fastness, water fastness and smear fastness (resistance to bleed m a highlighter pen stroke) are all improved. Polymer 4 is also advantageously employed in an ink without PUD.

Ink Containing a Graft Copolymer as the Soluble Structure Polymer

Polymer 5, a soluble, grafted polymer was prepared as follows. First a macromonomer of ethoxytriethyleneglycol methacrylate-co-methacrylic acid, was made by reaction of portions 1-3.

|  | Parts by Weight |
| --- | --- |
| Portion 1 | |
| Isopropanol | 124 |
| Acetone | 126 |
| Methanol | 115 |
| Portion 2 | |
| Methacrylic acid monomer (MAA) | 215 |
| Ethoxytriethyleneglycol methacrylate monomer (ETEGMA) | 31 |
| Methanol | 40 |
| Portion 3 | |
| Bis(borondifluorodiphenyl glyoximato) Cobaltate (II), | 0.197 |
| 2,2'-azobis(2,4-dimethylvaleronitrile), (Vazo ® 52 from DuPont Co., Wilmington, DE) | 7.151 |
| Acetone | 90 |

Portion 1 mixture was charged into a 2 liter flask equipped with a thermometer, stirrer, addition funnels, reflux condenser and a means of maintaining a nitrogen blanket over the reactants. The mixture was heated to reflux temperature and refluxed for about 20 minutes. Portion 2 solution was added over 240 minutes. Portion 3 was fed to the reactor over 270 min. simultaneously with portion 2 while the reaction mixture was held at reflux temperature at about 62° C. Reflux was continued for another 2 hours and the solution was cooled to room temperature. The resulting solution of macromonomer was a clear thin polymer solution and had a solid content of about 33%. The macromonomer contained 12.5 weight % of ethoxytriethyleneglycol methacrylate and 87.5% of methacrylic acid and had a weight average molecular weight of approximately 1600 and a number average molecular weight of 800 as measured by Gel Permeation Chromatography (GPC) on a methylated macromonomer sample using polymethyl methacrylate as the standard.

The macromonomer was then copolymerized with phenoxyethyl acrylate and ethoxytriethyleneglycol methacrylate to create the graft block structure. The following synthesis illustrates the preparation of a block copolymer, phenoxyethylacrylate-co-ethoxytriethyleneglycol methacrylate/g-ethoxytriethyleneglycol methacrylate-co-methacrylic acid, 50/20/4/26 by weight, from a macromonomer.

|  | Parts Weight |
| --- | --- |
| Portion 4 | |
| Macromonomer solution from above | 469 |
| 2-Pyrrolidone | 73 |
| Portion 5 | |
| Phenoxylethyl acrylate (POEA) | 250 |
| Ethoxytriethyleneglycol methacrylate (ETEGMA) | 96 |
| Isopropylalcohol | 6 |

|  | Parts Weight |
| --- | --- |
| Portion 6 | |
| t-butyl peroxypivalate | 15.8 |
| isopropanol | 90.4 |
| Portion 7 | |
| 2-Pyrrolidone | 403 |

The Portion 4 mixture was charged into a 3 L flask equipped with a thermometer, stirrer, addition funnels, reflux condenser and a means of maintaining a nitrogen blanket over the reaction mixture. The mixture was heated to reflux temperature and refluxed for about 10 minutes. At time zero, 16.7% of portion 6 solution was added. Subsequently, portion 5 and 80% of the remaining portion 6 were simultaneously added over 240 minutes while the reaction mixture was held at the reflux temperature of about 65° C. The reaction was held at reflux for another hour, and then, the remainder of portion 6 solution was added. The mixture was heated to 120° C. distilling and about 360 g of volatiles were collected. Approximately 30 g of portion 6 was added when the temperature reached 90° C. to thin the polymer solution. When the mixture reached 120° C. the heating was stopped and the remainder of portion 6 was added. The reaction was then cooled to room temperature. Subsequently, the polymer was neutralized with lithium hydroxide and the mixture was adjusted with water to provide a solution with a solids content of about 20%.

Polymer 5 thus produced was a graft polymer of POEA/ETEGMA-g-ETEGMA/MAA having an approximate overall composition of 50.4% POEA, 23.3% ETEGMA and 26.3% MM by weight, and a number average molecular weight of about 4000 and a weight average molecular weight of about 13600 g/mol.

Ink 8 with soluble grafted polymer 5 was prepared according to the following recipe.

|  | Composition (weight %) | | |
| --- | --- | --- | --- |
|  | E8 | E9 | E10 |
| Dispersion 2 (pigment basis) | 4.5 | 5 | 5 |
| Polymer 5 (solids basis) | 0.75 | 0.5 | 0.83 |
| Glycerol | 9 | 26.4 | 26.4 |
| Ethylene Glycol | 6 | — | — |
| BYK348 (surfactant) | 0.1 | — | — |
| 1-2 Hexanediol | 5 | — | — |
| Ethylenediaminetetra acetate, sodium salt | 0.01 | — | — |
| Water | Bal. | Bal. | Bal. |
| Properties | | | |
| Viscosity (cps @25 C.) | 2.78 | 3.18 | 3.48 |
| PH | 6.78 | 7.5 | 7.4 |
| Surface tension (Dyne/cm) | 25.8 | 63.3 | 54.7 |

As with the previous inventive inks, the soluble structured polymer in Inks E8-10 provides enhanced rub fastness and water fastness without detrimental effect on jetting performance.

The invention claimed is:
1. An aqueous inkjet ink composition comprising:
   (a) a self-dispersing pigment;
   (b) an aqueous vehicle; and
   (c) a structured polymer that is soluble in the aqueous vehicle, wherein said structured polymer is either
      i) a soluble AB or ABC block copolymer with an A block of benzyl methacrylate; or ii) a soluble graft copolymer, wherein said graft copolymer comprises 50-90% by weight, of a polymeric backbone and 10-50% by weight, of macromonomer side chains attached to the backbone at a single terminal point, and said graft copolymer has a weight average molecular weight of 5,000-100,000, wherein
(i') the polymeric backbone is hydrophobic in comparison to the side chains and consists essentially of polymerized phenoxyethylacrylate and ethoxytriethyleneglycol methacrylate, and up to 20% by weight, based on the weight of the graft copolymer, of polymerized methacrylic acid; and
(ii') the macromonomer sidechains have a weight average molecular weight of about 1,000-30,000 and consist of polymerized ethoxytriethyleneglycol methacrylate and 2-100% by weight, based on the weight of the macromonomer side chains, of polymerized methacrylic acid.

2. The ink of claim 1, wherein the soluble structured polymer is present at a weight ratio of pigment to soluble structured polymer of between about 0.5 to about 20.

3. The ink of claim 1, wherein the soluble structured polymer is an anionic polymer having a number average molecular weight in the range of about 1,000 to about 20,000.

4. The ink of claim 1, wherein the soluble structured polymer is a soluble AB or ABC block copolymer with an A block of benzyl methacrylate.

5. The ink of claim 1, further comprising a dispersed polymer binder.

6. The ink of claim 5, wherein the dispersed polymer binder is a polyurethane.

7. The ink of claim 1, wherein the self-dispersing pigment is a self-dispersing carbon black pigment comprising anionic hydrophilic moieties.

8. The ink of claim 7, wherein the anionic hydrophillic moieties on the self-dispersing carbon black pigment are primarily carboxyl groups directly attached to the pigment surface.

9. A method of inkjet printing comprising printing an inkjet ink from a thermal inkjet printhead where said inkjet ink is an ink according to any of claims 1, 3-4, and 7-8.

10. The ink of claim 1, wherein the ink is a thermal inkjet ink.

11. The ink of claim 4, wherein the soluble AB or ABC block copolymer is comprised of an A block of benzyl methacrylate and a B block selected from the group consisting of methacrylic acid, dimethylaminoethyl methacrylate, diethylaminoethyl methacrylate, dipropylaminoethyl methacrylate, and dibutylaminoethyl methacrylate.

12. The ink of claim 4, wherein the soluble structured polymer is a soluble AB block copolymer with an A block of benzyl methacrylate and a B block of methacrylic acid/ethylene glycol methacrylate copolymer.

13. The ink of claim 4, wherein the soluble structured polymer is a soluble ABC block copolymer with an A block of benzyl methacrylate, a B block of methacrylic acid, and a C block of ethoxyltriethyleneglycol methacrylate.

* * * * *